United States Patent
Koch et al.

[11] 4,076,743
[45] Feb. 28, 1978

[54] NOVEL BETAINES, PROCESSES FOR THE PREPARATION THEREOF AND RECOVERY OF UNDERGROUND PETROLEUM THEREWITH

[75] Inventors: Karlheinz Koch, Haan; Horst Rutzen, Langenfeld, both of Germany

[73] Assignees: Henkel KGaA, Dusseldorf; Durtsche Gold- und Silber-Scheideanstalt vormals Roessler, Frankfurt am Main, both of Germany

[21] Appl. No.: 758,035

[22] Filed: Jan. 10, 1977

[30] Foreign Application Priority Data

Jan. 10, 1976  Germany ............................ 2600779

[51] Int. Cl.$^2$ .................. C07C 101/12; C07C 101/24; C09K 3/00
[52] U.S. Cl. ......................... 260/501.13; 252/8.55 D; 252/528; 260/534 M
[58] Field of Search ....................... 260/501.13, 534 M

[56] References Cited

U.S. PATENT DOCUMENTS

| | | | |
|---|---|---|---|
| 3,275,552 | 9/1966 | Kern et al. | 260/501.13 |
| 3,360,550 | 12/1967 | Cowen et al. | 260/501.13 |
| 3,461,211 | 8/1969 | DeLarue et al. | 260/501.13 |
| 3,649,677 | 3/1972 | Morris | 260/501.13 |
| 3,660,142 | 5/1972 | Kasugai et al. | 260/501.13 |
| 3,689,470 | 9/1972 | Shachat et al. | 260/501.13 |
| 3,888,797 | 6/1975 | Marumo | 260/534 M |
| 4,012,437 | 3/1977 | Shachat et al. | 260/501.13 |
| 4,039,460 | 8/1977 | Koch et al. | 260/534 M |

*Primary Examiner*—Nicky Chan
*Attorney, Agent, or Firm*—Hammond & Littell

[57] ABSTRACT

The reaction of an aminoalkanol of the formula:

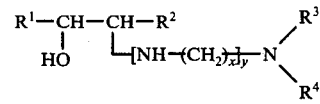

wherein $R^1$ and $R^2$ are $C_{1-17}$ aliphatic hydrocarbon groups (the sum of the carbon atoms in $R^1 + R^2$ being from 9 to 18); $R^3$ and $R^4$ represent the same or different $C_{1-6}$ alkyl or alkylol groups; $x$ represents a integer from 2 to 4; and $y$ represents 0 or 1, with a water-soluble halocarboxylic acid provides quaternary ammonium compounds. The compounds are amphoteric surface-active agents which are soluble in water containing high concentrations of NaCl, and are useful in the recovery of underground petroleum by the flooding method.

7 Claims, No Drawings

NOVEL BETAINES, PROCESSES FOR THE PREPARATION THEREOF AND RECOVERY OF UNDERGROUND PETROLEUM THEREWITH

FIELD OF THE INVENTION

The present invention relates to novel surface-active betaines, methods of producing them, and the use of these betaines in the recovery of petroleum from underground sands and other deposits.

OBJECTS OF THE INVENTION

A principal object of the invention is to provide surface-active agents which are freely water-soluble and which substantially retain their surface-activity when dissolved in water having a substantial content of dissolved salts.

A further object of the invention is to provide agents of the foregoing type which can be prepared easily from inexpensive raw materials in simple equipment.

A still further object of the invention is to provide a new flooding water for use in the recovery of petroleum from oil sands and other underground deposits by the flooding method wherein the flooding water may have a high dissolved content of salt.

THE INVENTION

The above objects are substantially met by the present invention, which provides a novel group of betaines having the formula (shown as an inner salt):

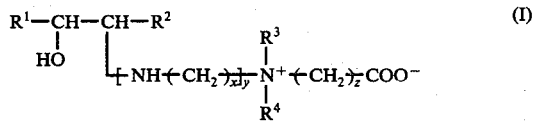
(I)

wherein $R^1$ and $R^2$ are aliphatic $C_{1-17}$ hydrocarbon groups, (wherein the sum of the carbon atoms of $R^1$ and $R^2$ amounts to 9 to 18); $R^3$ and $R^4$ represent the same or different low ($C_{1-6}$) alkyl or alkylol groups; $x$ represents an integer from 2 to 4; $y$ represents 0 to 1; and $z$ represents an integer from 1 to 4.

When $y$ represents 0, one group of betaines therefore can have the structure:

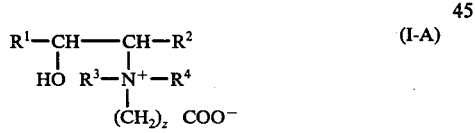
(I-A)

wherein $R^1$ - $R^4$ and z have the meanings given above. The betaines of the present invention possess excellent interface-active (i.e., surface-active) properties. They are amphoteric and possess very satisfactory water-solubility in acid, neutral and alkaline solutions and in aqueous solutions having a dissolved content of sodium chloride and similar soluble salts.

The present invention also provides a process for producing the betaines described above by reacting an aminoalkanol of the formula:

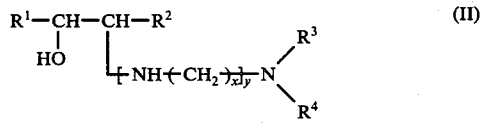
(II)

wherein the groups $R^1$ to $R^4$, and the integer designators x and y, have the significance given above, with about an equimolar quantity of a monohalocarboxylic acid (or a salt thereof). A reaction of this type is shown in Houben-Weyl, Methoden der organischen Chemie, Volume 11/2 (1958), page 630.

The reaction is continued until formation of ionic chlorine has substantially ceased. If desired, the quaternizing compound can be added in slight excess, and a slight deficiency of the quaternizing compound is tolerated well.

When the two amino groups are present in the starting aminoalkanol (i.e., when y equals 1), an alternative reaction proceeds during quaternization and provides a product which results from reaction of the halocarboxylic acid with the secondary nitrogen atom of the aminoalkanol and not the tertiary nitrogen atom of the compound. This alternative or secondary product has the formula:

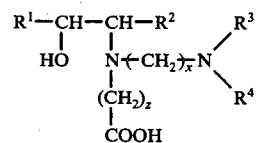

wherein $R^1$ - $R^4$ and x and y have their above-stated meanings, and generally amounts to 1% – 20% by weight of the betaines of the present invention (formula I above) which are formed during the reaction.

In the latter instance, the invention provides a mixture consisting essentially of (A) a compound of the formula:

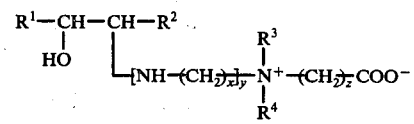

and (B) a minor amount of a compound of the formula:

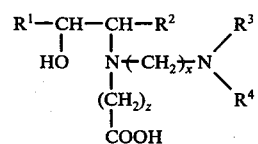

(or salt thereof), wherein $R^1$ and $R^2$ each represent a $C_{1-17}$ aliphatic hydrocarbon group, the sum of the number of carbon atoms in $R^1$ and $R^2$ being 9 to 18; $R^3$ and $R^4$ represent the same or different $C_{1-6}$ alkyl or alkylol groups; x represents 2,3 or 4; y represents 0 or 1, and z represents 1, 2, 3 or 4; and wherein the weight of (B) is less than 20% of the weight of (A).

Unexpectedly, it was found that the presence of this minor amount of secondary product (formula III) is in no way disadvantageous to the principal product (formula I); the above-described mixture possesses substantially the same valuable properties as the compounds of formula I in pure state.

The starting aminoalkanols (formula II above) can be produced by condensing one or more epoxyalkanes of the formula:

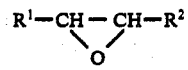

with one or more amines of the formula:

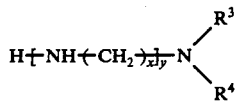

wherein $R^1$ - $R^4$, $x$ and $y$ have the meanings shown above. Reactions of this type are disclosed in German patent application DOS 25 20 267.9, filed May 7, 1975 and Ser. No. 683,322, filed May 5, 1976.

All epoxyalkanes conforming to formula (IV) above (i.e., all epoxyalkanes which have a non-terminal epoxy group, and wherein the chains are preferably unbranched and contain 11 to 20 carbon atoms), are suitable as the epoxy starting material. Mixtures of epoxyalkanes of different chain lengths and/or with the epoxy grouping in isomeric non-terminal positions are preferred. Epoxy-alkanes of formula (IV) are obtainable in a known manner by epoxydation of corresponding olefins. By way of example, such olefins or mixtures of olefins (i.e., olefins having non-terminal double bonds) can be prepared by catalytic dehydration of chlorination/dehydrochlorination of linear paraffins of the above-mentioned range of chain length followed by selective extraction of the mono-olefin fraction having non-terminal unsaturation.

Suitable amines within the definition of formula (V) are secondary amines such as dimethylamine, methylethylamine, diethylamine, dibutylamine and diethanolamine, as well as asymmetrically disubstituted diamines, for example N,N-dimethylethylenediamine, N,N-dimethylpropylenediamine, N-methyl-N-ethylethylenediamine, N,N-diethylethylenediamine, N,N-diethanolpropylenediamine and N,N-diethanoltetramethylenediamine. Groups $R^3$ and $R^4$ in the formulae above are preferably methyl.

Monohalocarboxylic acids having 1 to 5 carbon atoms and the water-soluble salts thereof, preferably sodium chloroacetate, can be used to quaternize the aminoalkanols.

The invention also relates to the use of the betaines in accordance with formula (I) in the extraction of mineral oil (i.e., petroleum) from underground deposits. It is known that, in addition to customary primary methods of extracting petroleum (for example pumping), secondary and tertiary methods are now being used in order to recover the considerable quantities of petroleum which cannot be extracted from static subterranean deposits by the primary methods. So-called "flooding" is one of the most common of the secondary methods. In this method, an aqueous liquid (the "flooding water") is forced under adequate pressure at one or at a plurality of points into a subterranean deposit of mineral oil, and the mineral oil is displaced in the direction of one or a plurality of boreholes (i.e., wells), through which it is pumped to the surface. It is known that the efficacy of this method can be substantially improved by adding one or more surfactants to the flooding water (which is generally local or "formation" water). The surfactants reduce the interfacial (i.e., surface) tension between the oil and the flooding water and the lower the surface tension of the flooding water, the more effective is the method.

Nonionic compounds and anionic compounds (chiefly petroleum sulfonates), a number of which are disclosed in German Offenlegungschrift 24 30 935), have been proposed as surfactants, although the latter have the disadvantage of being soluble only in formation waters which have a low content of salt. Thus, a large number of the surfactants proposed hitherto cannot be used for the recovery of petroleum from deposits in which highly saline formation water (water having a salt content of 10% to 30%) is found as is the case in most petroleum deposits in Germany and in fact in northern Europe. The salts are mineral or ocean salts, chiefly sodium chloride.

The betaines of the present invention (formula I above) are satisfactorily soluble in water having a high salt content and, since they are amphoteric and highly surface active, they are capable of providing underground flooding waters of greatly decreased surface tension at acid, neutral and alkaline pH values. They are therefore eminently suitable for the improvement of all types of flooding waters presently used for the recovery of petroleum from underground deposits.

The betaines are added to the flooding water in an amount which is sufficient to provide an efficient decrease in the surface tension of the flooding water, as indicated by the amount of petroleum being recovered. The concentration of the betaine (or mixture of betaines) in the flooding water is generally within the range of 0.01% to 15% by weight. Amounts within the range of 0.1% to 5% are generally very effective, and this range is therefore preferred.

The betaines can be incorporated in the flooding water in any convenient manner. In most instances it will be found most convenient to form a concentrated aqueous solution of the betaine in water of any desired pH and then to meter the solution into the flooding water as it is pumped into the ground.

Conventional agents can be added in customary effective amounts to the flooding water. Such additional agents are, for example, other compatible surface-active agents; electrolytes; corrosion inhibitors; microbicides; and agents increasing the viscosity of the flooding water. They can be added in admixture with or apart from the betaine solution.

The invention will further be described by the following examples. These examples illustrate the invention, and are not to be construed in limitation thereof. Parts are by weight unless otherwise stated.

EXAMPLE 1

The following illustrates the preparation of a betaine quaternary according to the present invention.

A mixture of 255 g. (approximately 1 mol) of a mixture of the epoxy derivatives of non-terminally unsaturated $C_{15}$-$C_{18}$ olefines having the following chain length distribution:

| Chain Length | % by Weight |
| --- | --- |
| $C_{15}$ | 26 |
| $C_{16}$ | 35 |
| $C_{17}$ | 31 |
| $C_{18}$ | 6 |

612 g. (6 mols) of N,N-dimethyl-1,3-propylenediamine, and 9 g. (0.5 mol) of water was stirred for 5 hours in an autoclave at 200° C. The maximum pressure attained was 25–30 atmospheres. After completion of the reaction excess (unreacted) diamine was removed by distillation and the aminoalkanol thus obtained (305 g., equivalent to 85% of theory) was added to a solution of an equimolecular amount (99 g.) of sodium chloroacetate in 750 ml of water. The mixture was stirred at 80° – 100° C. until it became homogeneous (about half an hour).

The compound is recovered in dry form by evaporation of the water under vacuum. The compound is readily soluble in water, and 0.1% aqueous solution thereof possesses surface-active (wetting, emulsifying) properties. The characteristic data of the betaine obtained are provided in Table 1.

EXAMPLE 2

The product of Example 1 in aqueous solution is neutralized with acetic acid. The solution possesses surface-active properties.

EXAMPLE 3

The following illustrates the preparation of another betaine quaternary according to the present invention.

To a mixture of 198 g. (approximately 1 mol) of a mixture of the epoxy derivatives of non-terminally unsaturated $C_{11-14}$ olefines having the following chain length distribution:

| Chain Length | % by Weight |
|---|---|
| $C_{11}$ | 22 |
| $C_{12}$ | 30 |
| $C_{13}$ | 26 |
| $C_{14}$ | 22 |

18 g. (0.2 mol) of glycerol, and a few drops of N,N-dimethyl-1,3-propylenediamine at 190°–200° C. was added dropwise 112 g. (1.1 mol) of N,N-dimethyl-1,3-propylenediamine. The resulting mixture was agitated for 2 hours under reflux (200°–210° C.) and the glycerol was then washed out with water. 258 g. (90% of the theoretical amount) of the resulting aminoalkanol (purified by distillation) was added to a solution of 104 g. of sodium chloroacetate in 550 ml of water and stirred at 80°–90° C. until a homogeneous solution formed (about half an hour). The resulting betaine had the characteristic data shown in Table 1.

A sample of the solution is dried. The betaine thus recovered is water-soluble and possesses surface-active properties similar to those of the betaine of Example 1.

EXAMPLE 4

A solution of the product of Example 3 is neutralized with acetic acid. The resulting solution possesses surface-active properties similar to those of the solution of Example 2.

EXAMPLES 5–8

Additional betaines according to the invention are prepared by the methods of Examples 1 and 2 employing the starting materials shown in the table below. The principal physical properties of the products are shown in the table below.

TABLE 1

| Product | Starting Epoxy Cpd. | Amine | Active % | NaCl % | pH (1% Soln.) | Density 20° C. | Visc. Cp. 50° C. |
|---|---|---|---|---|---|---|---|
| I 14 DM-B | $C_{11}$–$C_{14}$* | Dimethyl-amine | 47.9 | 8.75 | 6.05 | 1.0676 | 24.6 |
| I 58 DM-B | $C_{15}$–$C_{18}$** | | 30.6 | 4.30 | 6.05 | 0.9962 | 44.2 |
| I 14 DMAP-B | $C_{11}$–$C_{14}$ | N,N-Di-methyl-1,3-pro-pylene-diamine | 35.7 | 5.54 | 9.05 | 1.0469 | 39.3 |
| I 14 DMAP-BN*** | $C_{11}$–$C_{14}$ | | 38.6 | 5.4 | 7.00 | 1.0597 | 26.2 |
| I 58 DMAP-B | $C_{15}$–$C_{18}$ | | 35.6 | 4.35 | 8.40 | 1.0274 | 185.5 |
| I 58 DMAP-BN*** | $C_{15}$–$C_{18}$ | | 40.8 | 4.53 | 7.00 | 1.0442 | 290.3 |

*Described in Example 2.
**Described in Example 1.
***Neutralized with acetic acid.

Products I 14 DM-B and I 58 DM-B possess the structure shown in formula (I-A) above, wherein the sums of the carbon atoms in $R^1 + R^2$ are respectively 11–14 and 15–18, and wherein $R^3$ and $R^4$ each represents methyl.

We claim:

1. Water-soluble betaines of the formula:

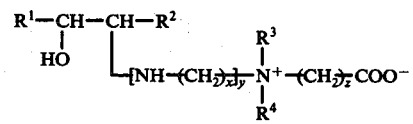

wherein $R^1$ and $R^2$ each represents a $C_{1-17}$ alkyl group, the sum of the number of carbon atoms in $R^1$ and $R^2$ being 9 to 18; $R^3$ and $R^4$ represents the same or different $C_{1-6}$ alkyl or alkylol group; x represents 2,3 or 4; y represents 0 or 1, and z represents 1, 2, 3 or 4.

2. Betaines according to claim 1 wherein $R^1$ and $R^2$ represent unbranched alkyl groups.

3. Betaines according to claim 2 wherein $R^3$ and $R^4$ represent methyl.

4. Betaines according to claim 1 wherein z represents 1.

5. A betaine of the formula:

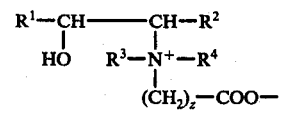

wherein $R^1$ and $R^2$ each represents a $C_{1-17}$ alkyl group, the sum of the number of carbon atoms in $R^1$ and $R^2$ being 9 to 18; $R^3$ and $R^4$ represent the same or different $C_{1-6}$ alkyl or alkylol groups; and z represents 1, 2, 3 or 4.

6. A betaine according to claim 5 wherein the sum of the carbon atoms in $R^1$ and $R^2$ is 11 to 18; $R^3$ and $R^4$ each are methyl; and z represents 1.

7. A mixture consisting essentially of (A) a compound of the formula:

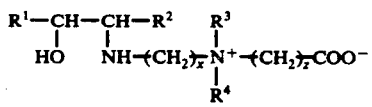

and (B) a compound of the formula:

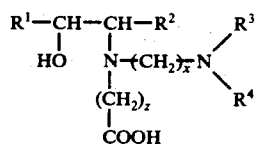

wherein $R^1$ and $R^2$ each represents a $C_{1-17}$ alkyl group, the sum of the number of carbon atoms in $R^1$ and $R^2$ being 9 to 18; $R^3$ and $R^4$ represent the same or different $C_{1-6}$ alkyl or alkylol groups; $x$ represents 2, 3 or 4; and $z$ represents 1, 2, 3 or 4; and wherein the weight of (B) is 1% to 20% of the weight of (A).

* * * * *